United States Patent Office 3,506,703
Patented Apr. 14, 1970

3,506,703
NOVEL N-CARBALKOXY DIBENZOCYCLO-
HEPTENE-5-CARBOXAMIDES
Martin A. Davis, Montreal, Quebec, Canada, assignor to American Home Products Corporation, New York, N.Y., a corporation of Delaware
No Drawing. Filed Jan. 31, 1967, Ser. No. 612,780
Int. Cl. C07c 125/06
U.S. Cl. 260—471    2 Claims

ABSTRACT OF THE DISCLOSURE

There are disclosed herein N-carbethoxy-10,11-dihydro-5H-dibenzo[a.d]cycloheptene-5-carboxamide and a number of N-carbo-(lower alkoxy)-10,11-dihydro-5H-dibenzo[a,d]cycloheptene-5-carboxamides as well as a process for preparing those compounds. The compounds disclosed herein are useful as anticonvulsant, trichomonicidal, and antibacterial agents, and methods for their use are also given.

This invention relates to novel chemical compounds having useful biological properties. More particularly, this invention relates to novel N-carbalkoxy-10,11-dihydro-5H-dibenzo[a,d]cycloheptene-5-carboxamides of the following Formula I:

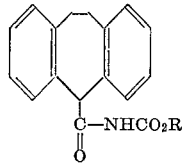

wherein R represents a lower alkyl group of from 1 to 5 carbon atoms, such as, for example, the methyl, ethyl, propyl, butyl, or pentyl groups.

The novel compounds of Formula I are conveniently secured by the following process. A 10,11-dihydro-5H-dibenzo[a,d]cycloheptene-5-carbonyl isocyanate of Formula II is interacted with a lower alkanol, ROH, wherein R is as defined above at temperatures ranging from 25 to 80° C. This serves to furnish the desired N-carbalkoxy compounds which may be then isolated and purified in the conventional manner.

The requisite isocyanate intermediate of Formula II is prepared as disclosed in our co-pending U.S. patent application S.N. 612,779 filed Jan. 3, 1967. Briefly, this involves treatment of 10,11-dihydro-5H-dibenzo[a,d]cycloheptene-5-carboxamide with a small molar excess of oxalyl chloride followed by strong heating of the intermediate 2-(10,11-dihydro-5H-dibenzo[a,d]cyclohepten-5-ylidene)-oxazolidine-4,5-dione. The resulting isocyanate obtained in semi-pure form is suitable for further interaction with an appropriate alkanol.

The novel compounds of Formula I have useful biological properties. In mammals, at doses considerably below those causing toxic manifestations, they effectively inhibit the convulsions caused by the administration of electroshock and are anticonvulsant agents. For such use, they may be formulated as dry powder capsules, compressed tablets, or as suspensions in suitable aqueous vehicles containing from 100 to 400 mg. of the active ingredient per unit dosage form. Such forms may be administered from once to four times daily. In addition to the above-mentioned property of affecting the central nervous system, the compounds also have activity against the parasitic organism Trichomonas foetus and are trichomonacidal agents. Furthermore, they have activity against a number of bacterial microorganisms and are antibacterial agents, active against a number of gram-positive and gram-negative organisms such as, for example, Staphylococcus pyogenes (both penicillin-sensitive and penicillin-resistant strains), Sarcina lutea, Streptococcus faecalis, Escherichia coli, Aerobacter aerogenes, Salmonella pullorum, Pseudomonas aeruginosa, Proteus mirabilis, and Proteus vulgaris. For this purpose, they may be formulated with suitable excipients in the form of lotions, ointments or creams, containing from 0.1 to 1 percent of the active ingredient and may be applied topically to the skin twice to four times daily.

The following formulae, in which R is as defined above, and descriptive examples will illustrate this invention.

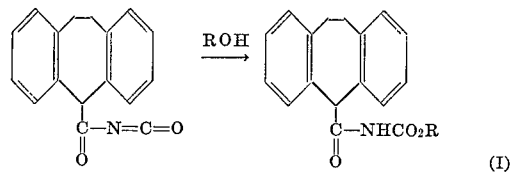

EXAMPLE I

N-carbethoxy-10,11-dihydro-5H-dibenzo[a,d]-cycloheptene-5-carboxamide 10,11-dihydro-5H-dibenzo[a,d]cycloheptene-5-carbonyl isocyanate (2.5 g.) is dissolved in pure, anhydrous ethanol (50 ml.), and the solution is warmed briefly at the boiling point of the solvent, for example, at about 80° C. The ethanol is then removed by evaporation in vacuo and the residual crude title product is purified by recrystallization from a mixture of ethyl acetate and hexane to furnish a purified sample of M.P. 157–158° C. Elemental analysis confirms the empirical formula $C_{19}H_{19}NO_3$. The structure is fully corroborated by the infrared, ultraviolet, and proton-magnetic resonance spectral data.

EXAMPLE 2

Following the procedure set forth in Example 1, but using in place of ethanol, the alkanol methanol, 1-propanol, 2-propanol, 1-butanol or 2-butanol or 1-pentanol, and operating in the temperature range of from 25 to 80° C., the N-carbomethoxy, N-carbo-1-propoxy, N-carbo-2-propoxy, N-carbo-1-butoxy or N-carbo-2-butoxy or N-carbo-1-pentyloxy-10,11-dihydro - 5H - dibenzo[a,d] cycloheptene-5-carboxamides are obtained.

I claim:
1. A compounds of the formula

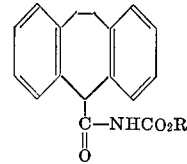

wherein R represents lower alkyl.

2. N - carbethoxy-10,11-dihydro-5H-dibenzo[a,d]cycloheptene-5-carboxamide, as claimed in claim 1.

References Cited

UNITED STATES PATENTS
3,160,648   12/1964   O'Brochta et al.

LORRAINE A. WEINBERGER, Primary Examiner
L. A. THAXTON, Assistant Examiner

U.S. Cl. X.R.
260—545; 424—300